United States Patent
Singh et al.

(10) Patent No.: US 9,291,210 B2
(45) Date of Patent: Mar. 22, 2016

(54) FLYWHEEL AND DUAL CLUTCH MODULE ASSEMBLY

(71) Applicant: GM Global Technology Operations LLC, Detroit, MI (US)

(72) Inventors: Tejinder Singh, Commerce Township, MI (US); Randal William Arndt, White Lake, MI (US); John A. Diemer, Farmington Hills, MI (US); Rima Philippin, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/456,370

(22) Filed: Aug. 11, 2014

(65) Prior Publication Data

US 2016/0040727 A1     Feb. 11, 2016

(51) Int. Cl.
*F16D 13/58*     (2006.01)
*F16D 21/06*     (2006.01)
*F16F 15/315*     (2006.01)

(52) U.S. Cl.
CPC .............. *F16D 13/58* (2013.01); *F16F 15/315* (2013.01); *F16D 21/06* (2013.01); *F16D 2021/0607* (2013.01); *F16D 2250/0061* (2013.01); *F16D 2250/0084* (2013.01); *F16D 2300/12* (2013.01)

(58) Field of Classification Search
None
See application file for complete search history.

(56) References Cited

U.S. PATENT DOCUMENTS

| | | | |
|---|---|---|---|
| 4,520,913 A | 6/1985 | Maucher et al. | |
| 4,630,720 A | 12/1986 | Boni | |
| 4,741,227 A | 5/1988 | Yamada et al. | |
| 5,927,452 A | 7/1999 | Freise et al. | |
| 6,568,518 B2 | 5/2003 | Sarar | |
| 6,814,204 B2 | 11/2004 | Diemer et al. | |
| 7,063,195 B2 | 6/2006 | Berhan | |
| 7,637,362 B2 | 12/2009 | Swinford-Meyer et al. | |
| 8,403,120 B2 | 3/2013 | Voegtle et al. | |
| 8,413,780 B2 | 4/2013 | Yildiz et al. | |
| 8,631,920 B2 | 1/2014 | Carey et al. | |
| 2006/0289263 A1* | 12/2006 | Friedmann .............. | F16D 13/58 192/48.8 |

* cited by examiner

*Primary Examiner* — Rodney H Bonck

(57) ABSTRACT

A dual mass flywheel and dual clutch module assembly includes a connector plate and a drive plate. The connector plate is fastened to a center plate of the dual clutch module and has a plurality of castellation tabs disposed on an inner periphery of the connector plate. The drive plate drivingly connected to a flywheel member of the dual mass flywheel and includes a plurality of castellation tabs disposed on an inner periphery of the drive plate. The plurality of castellation tabs of the connector plate are interleaved with the plurality of castellation tabs of the drive plate.

20 Claims, 3 Drawing Sheets

FLYWHEEL AND DUAL CLUTCH MODULE ASSEMBLY

TECHNICAL FIELD

The present disclosure relates to powertrains and more particularly to a dual mass flywheel connector plate for connecting an engine crankshaft to a dual clutch module of a transmission.

BACKGROUND

The statements in this section merely provide background information related to the present disclosure and may or may not constitute prior art.

A typical dual clutch transmission is paired with a dual mass flywheel to filter a wider range of vibrations from the engine. Currently, the dual mass flywheel is fastened to the crankshaft of the engine prior to the transmission, and therefore the dual clutch module, is assembled to the bellhouse of the engine. Accordingly, the dual clutch module is drivingly connected to the dual mass flywheel via a connection other than fasteners or the like. This necessitates a larger overall packaging envelope with some potential for loss performance.

While current connections between a dual mass flywheel and a dual clutch module achieve their intended purpose, the need for new and improved connection configurations which exhibit improved performance, especially from the standpoints of packaging efficiency, ease of assembly, and robustness is essentially constant. Accordingly, there is a need in the art for a dual clutch module and dual mass flywheel connection having improved packaging while providing manufacturing flexibility and robustness.

SUMMARY

The present invention provides a dual mass flywheel and dual clutch module assembly comprises a connector plate and a drive plate. The connector plate is fastened to a center plate of the dual clutch module. The connector plate has a plurality of castellation tabs disposed on an inner periphery of the connector plate. The drive plate is drivingly connected to a flywheel member of the dual mass flywheel. The drive plate having a plurality of castellation tabs disposed on an inner periphery of the drive plate. The plurality of castellation tabs of the connector plate are interleaved with the plurality of castellation tabs of the drive plate.

In one example of the present invention, the plurality of castellation tabs of the drive plate extend in a first axial direction and the plurality of castellation tabs of the connector plate extend in a second axial direction which is opposite the first axial direction.

In another example of the present invention, the connector plate includes a plurality of tabs on an outer periphery of the connector plate, the plurality of tabs having at least one fastener bore aligned with a fastener bore of the center plate of the dual clutch module, and wherein a rivet is disposed in each of the fastener bores of the connector plate and the center plate.

In yet another example of the present invention, each one of the plurality of castellation tabs of the drive plate include a pilot feature.

In yet another example of the present invention, each one of the plurality of castellation tabs of the connector plate include a pilot feature.

In yet another example of the present invention, the drive plate has an outer periphery including a plurality of tab portions that are keyed to rotationally connect with a flywheel member of the dual mass flywheel.

In yet another example of the present invention, the connector plate has an outer periphery including a plurality of tab portions each having a radially extending portion adjacent to an axially extending portion adjacent to a fastening portion.

In yet another example of the present invention, the fastening portion of the connector plate includes at least one fastener bore and at least one structural stiffener.

In yet another example of the present invention, the outer periphery of the center plate includes a plurality of axially extending tabs having at least one fastener bore, each of the plurality of tabs abuts the fastening portion of one of the plurality of tabs of the connector plate, and a rivet is disposed in each of the fastener bores of the connector plate and the drive plate.

The above features and advantages and other features and advantages of the present invention are readily apparent from the following detailed description of the best modes for carrying out the invention when taken in connection with the accompanying drawings.

DESCRIPTION

Figure 1:
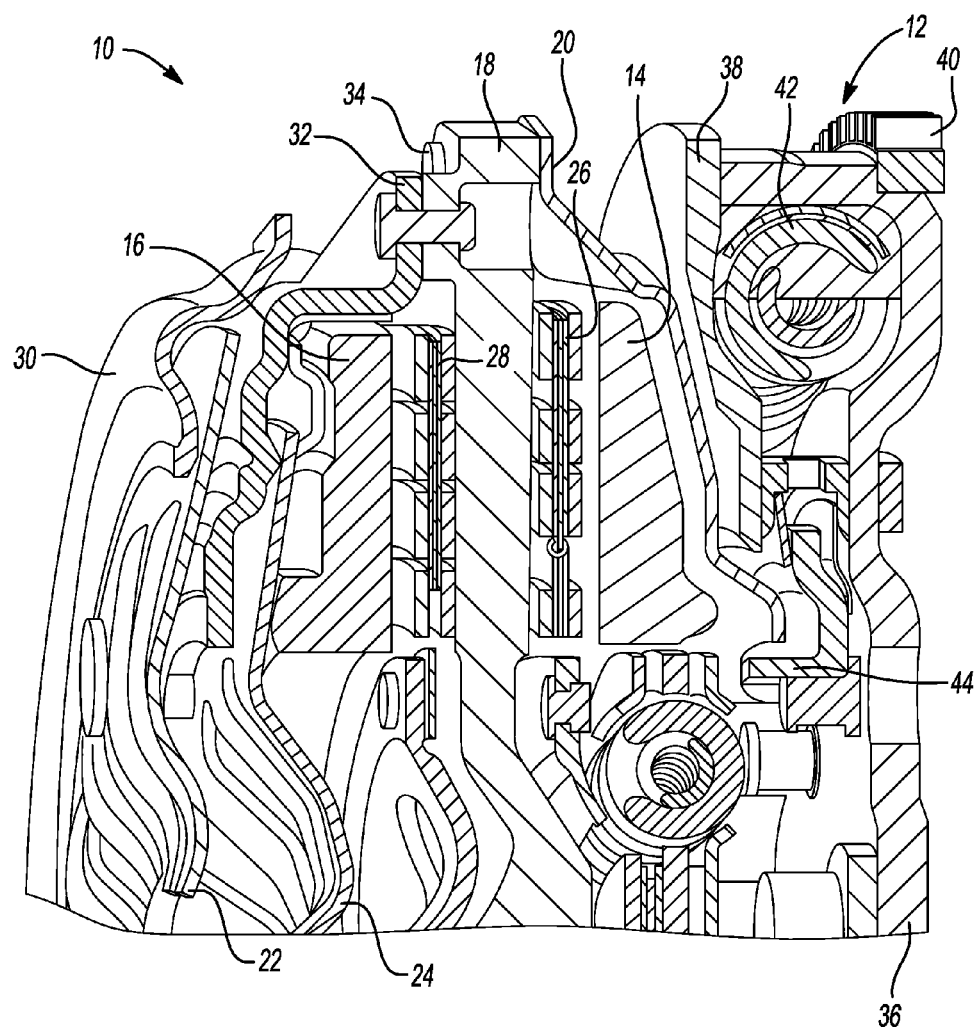
FIG. 1 is a cross section of an embodiment of a dual mass flywheel and a dual clutch module, in accordance with the present invention.

Referring to FIG. 1, a dual clutch module and a dual mass flywheel are generally indicated by the reference numbers 10 and 12, respectively. The dual clutch module 10 includes a first and a second clutch plates 14, 16, a center plate 18, a connector plate 20, a first and second lever plates 22, 24, a first and second friction disc 26, 28, and a first and second actuator plate 30, 32. The center plate 18 is connected on the outer periphery to the connector plate 20 via a plurality of rivets 34. However, other types of fasteners may be used without departing from the scope of the invention. The first friction disc 26 is disposed between the central plate 18 and the first clutch plate 14 and is connected for common rotation with a first transmission input shaft (not shown). The second friction disc 28 is disposed between the central plate 18 and the second clutch plate 16 and is connected for common rotation with a second transmission input shaft (not shown). The first actuator plate 30 is connected to the outer periphery of the first clutch plate 14. The second actuator plate 32 is connected to the outer periphery of the center plate 18. The first lever plate 22 is disposed between the first actuator plate 30 and the second actuator plate 32. The second lever plate is disposed between the second actuator plate 32 and the second clutch plate 16. The lever plates 30, 32 are selectively actuated for axial movement by a dual clutch actuator (not shown). As the first lever plate 22 is axially actuated by the dual clutch actuator, the first lever plate 22 pivots off the second actuator plate 32 and axially translates the first actuator plate 30 thus compressing the first friction disc 26 between the first clutch plate 14 and the center plate 18 (actuator plate 30 is connected to the first clutch plate 14). As the second lever plate 24 is axially actuated by the dual clutch actuator, the second lever plate 24 pivots off the second actuator plate 32 and axially translates the second clutch plate 16 compressing the second friction disc 28 between the second clutch plate 16 and the center plate 18.

The dual mass flywheel 12 includes a first and second flywheel 36, 38, a starter ring gear 40, a plurality of springs 42, and a drive plate 44. The first flywheel 36 is connected for common rotation with the engine output shaft (not shown). The second flywheel 38 is disposed coaxially with the first flywheel 36. Each of the plurality of springs 42 has a first end and a second end with the first end connected to the first flywheel 36 and the second end connected to the second flywheel 38. The drive plate 44 is rotationally connected to each of the second flywheel 38 and the connector plate 20 of the dual clutch module 10.

Figure 2:
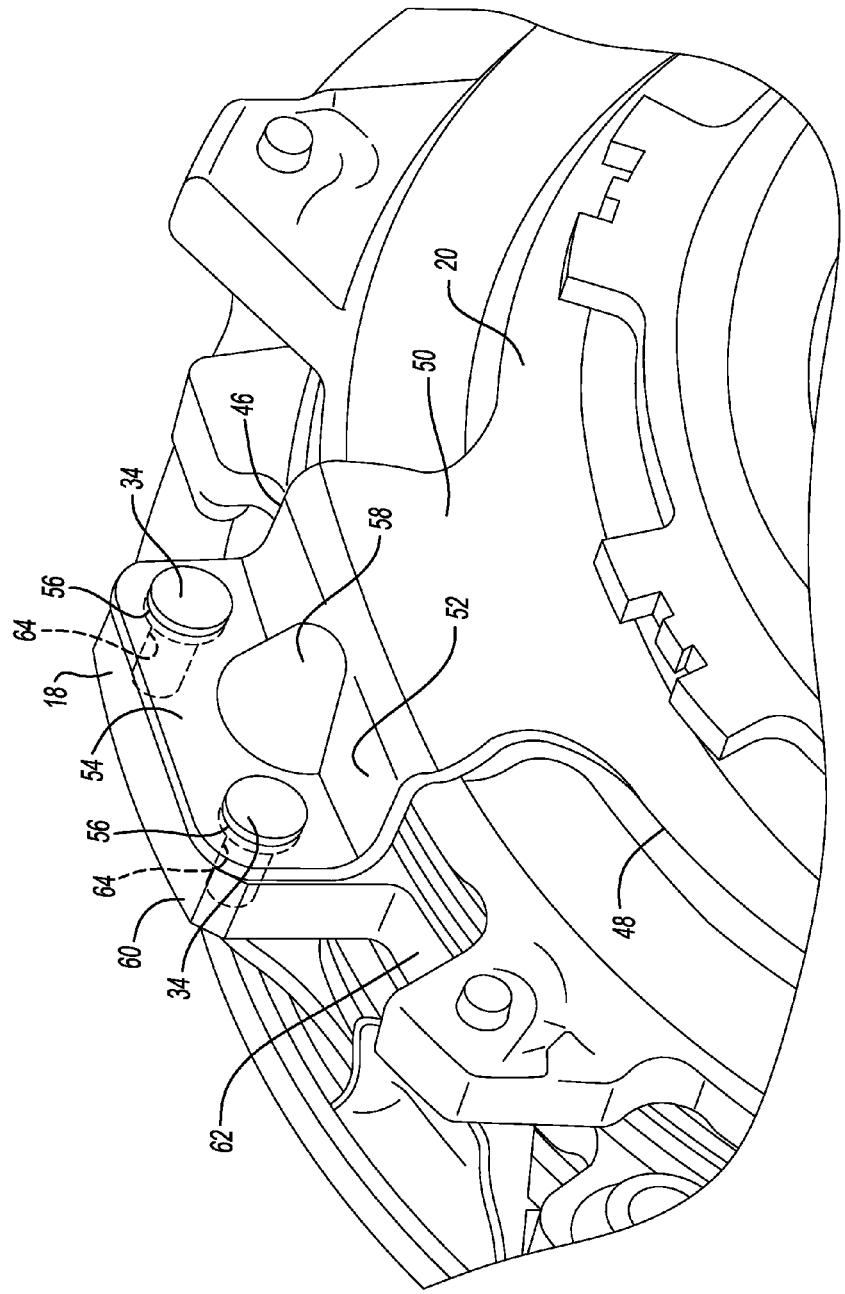
FIG. 2 is a perspective view of portion of an embodiment of a dual clutch module, in accordance with the present invention.

Referring now to FIG. 2, a detailed view of an embodiment of the dual clutch module 10 and dual mass flywheel 12 is illustrated and will now be described. The connector plate 20 includes a plurality of tab portions 46 extending from an outer periphery 48 of the connector plate 20. Each of the plurality of tab portions 46 includes a radially extending portion 50, an axially extending portion 52, and a fastening portion 54. The axially extending portion 52 is disposed between the radially extending portion 50 and the fastening portion 54. Furthermore, the fastening portion 54 includes at least one fastener bore 56 and at least one structural stiffener or rib 58. Additionally, the center plate 18 has a plurality of tab portions 60 extending radially from an outer periphery 62 of the center plate 18. The each of the plurality of tab portions 60 of the center plate 18 include at least one fastener bore 64 and align with the fastening portion 54 of the plurality of tab portions 46 of the connector plate 20. A rivet 34 is disposed in each of the fastener bores 48, 64 thus connecting the tab portions 46, 60 of the connector plate 20 and the center plate 18 respectively.

Figure 3:
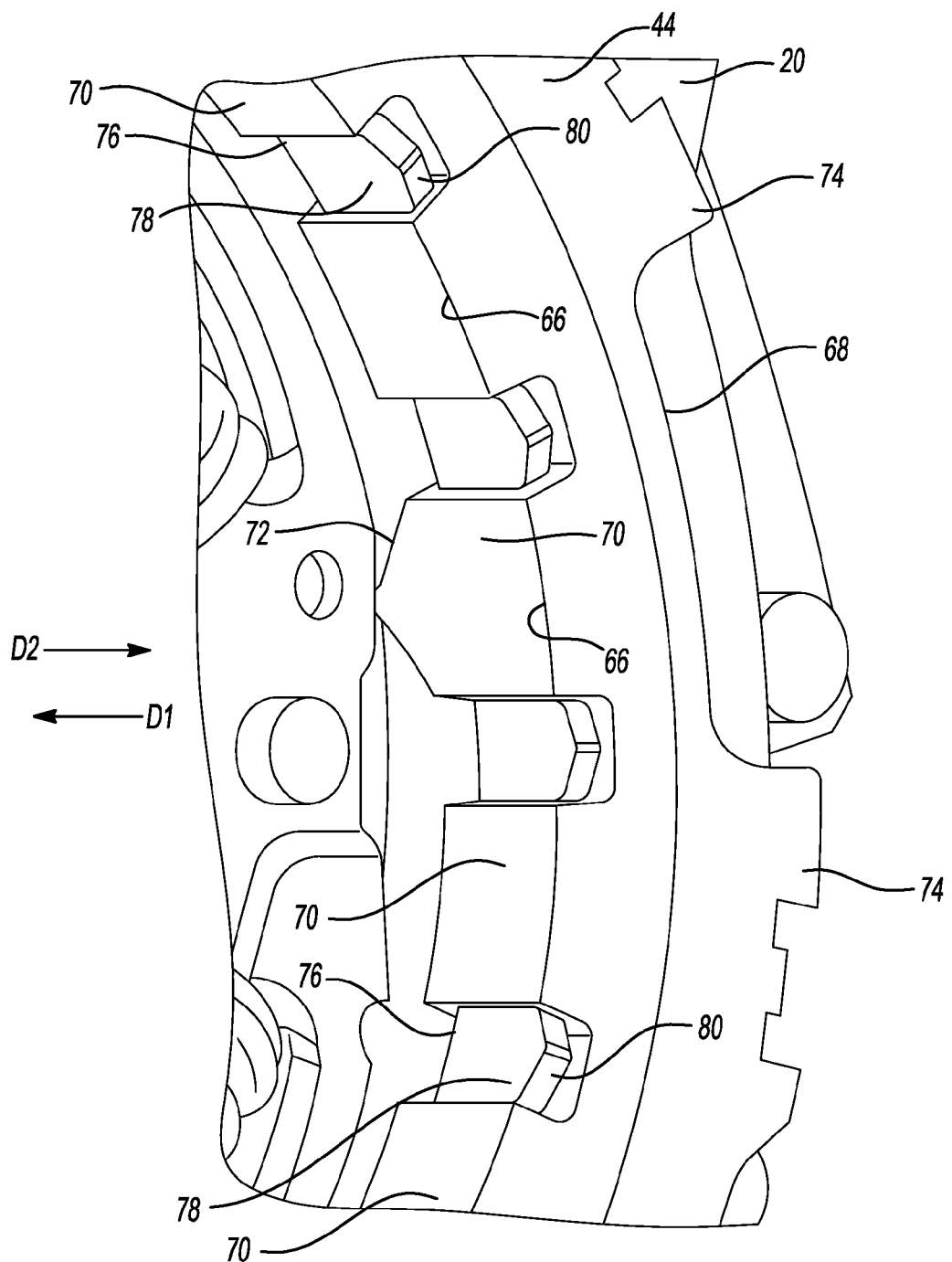
FIG. 3 is a perspective view of a portion of an embodiment of a dual mass flywheel connector plate and a dual clutch module, in accordance with the present invention.

Referring now to FIG. 3, a detailed view of an embodiment of the dual clutch module 10 and dual mass flywheel 12 is illustrated and will now be described. The drive plate 44 has an annular disc shape with an inner periphery 66 and an outer periphery 68. The drive plate 44 includes a plurality of tabs or castellations 70 disposed on the inner periphery 66 of the drive plate 44 and extending in a first axial direction D1. The castellations 70 are equal in width while having an equal distance of space between each castellation 70. The castellations 70 may also include a castellation piloting feature 72 at the end or top of the castellation 70. The piloting features 72 aid in assembly of the flywheel 12 to the dual clutch module 10. Disposed on the outer periphery 68, the drive plate 44 also includes a plurality of tab portions 74 that are keyed to rotationally connect with the second flywheel 38.

The connector plate 18 also includes an inner periphery 76 on which is disposed a plurality of tabs or castellations 78 extending in a second axial direction D2 which is opposite the first axial direction D1. The castellations 78 of the connector plate 20 have a width equal to the space between the castellations 70 of the drive plate 44. Furthermore, the space between the castellations 78 of the connector plate 20 have a width equal to the width of the castellations 70 of the drive plate 44. The castellations 78 may also include a piloting feature 80 at the end or top of the castellation 78. The piloting feature 80 aids in assembly of the flywheel 12 to the dual clutch module 10 by aligning the castellation 78 of the connector plate 20 to the space between the castellations 70 of the drive plate 44. When assembled, the castellations 70 of the drive plate 44 are interleaved with the castellations 78 of the connector plate 18 as shown in FIG. 3.

The description of the invention is merely exemplary in nature and variations that do not depart from the spirit of the invention are intended to be within the scope of the invention. Such variations are not to be regarded as a departure from the spirit and scope of the invention.

The following is claimed:

1. A dual mass flywheel and dual clutch module assembly comprises:
    a connector plate fastened to a center plate of the dual clutch module, the connector plate having a plurality of castellation tabs disposed on an inner periphery of the connector plate; and
    a drive plate drivingly connected to a flywheel member of the dual mass flywheel, the drive plate having a plurality of castellation tabs disposed on an inner periphery of the drive plate, and
    wherein the plurality of castellation tabs of the connector plate are interleaved with the plurality of castellation tabs of the drive plate, the plurality of castellation tabs of the drive plate extend in a first axial direction, and the plurality of castellation tabs of the connector plate extend in a second axial direction which is opposite the first axial direction.

2. The dual mass flywheel and dual clutch module assembly of claim 1 wherein the connector plate includes a plurality of tabs on an outer periphery of the connector plate, the plurality of tabs having at least one fastener bore aligned with a fastener bore of the center plate of the dual clutch module, and wherein a rivet is disposed in each of the fastener bores of the connector plate and the center plate.

3. The dual mass flywheel and dual clutch module assembly of claim 1 wherein each one of the plurality of castellation tabs of the drive plate include a pilot feature.

4. The dual mass flywheel and dual clutch module assembly of claim 1 wherein each one of the plurality of castellation tabs of the connector plate include a pilot feature.

5. The dual mass flywheel and dual clutch module assembly of claim 1 wherein the drive plate has an outer periphery including a plurality of tab portions that are keyed to rotationally connect with a flywheel member of the dual mass flywheel.

6. The dual mass flywheel and dual clutch module assembly of claim 1 wherein the connector plate has an outer periphery including a plurality of tab portions each having a radially extending portion adjacent to an axially extending portion adjacent to a fastening portion.

7. The dual mass flywheel and dual clutch module assembly of claim 6 wherein the fastening portion of the connector plate includes at least one fastener bore and at least one structural stiffener.

8. The dual mass flywheel and dual clutch module assembly of claim 7 wherein the outer periphery of the center plate includes a plurality of radially extending tabs having at least one fastener bore, each of the plurality of tabs abuts the fastening portion of one of the plurality of tabs of the connector plate, and a rivet is disposed in each of the fastener bores of the connector plate and the drive plate.

9. A dual mass flywheel and dual clutch module assembly comprises:
    a connector plate fastened to a center plate of the dual clutch module, the connector plate having a plurality of castellation tabs extending in a first axial direction and disposed on an inner periphery of the connector plate; and
    a drive plate drivingly connected to a flywheel member of the dual mass flywheel, the drive plate having a plurality of castellation tabs extending in a second axial direction toward the connector plate, the second axial direction is opposite the first axial direction, and the plurality of castellation tabs are disposed on an inner periphery of the drive plate, and wherein the plurality of castellation tabs of the connector plate are interleaved with the plurality of castellation tabs of the drive plate.

10. The dual mass flywheel and dual clutch module assembly of claim 9 wherein the connector plate includes a plurality of tabs on an outer periphery of the connector plate, the plurality of tabs having at least one fastener bore aligned with a fastener bore of the center plate of the dual clutch module, and wherein a rivet is disposed in each of the fastener bores of the connector plate and the center plate.

11. The dual mass flywheel and dual clutch module assembly of claim 10 wherein each one of the plurality of castellation tabs of the drive plate include a pilot feature.

12. The dual mass flywheel and dual clutch module assembly of claim 10 wherein each one of the plurality of castellation tabs of the connector plate include a pilot feature.

13. The dual mass flywheel and dual clutch module assembly of claim 10 wherein the drive plate has an outer periphery including a plurality of tab portions that are keyed to rotationally connect with a flywheel member of the dual mass flywheel.

14. The dual mass flywheel and dual clutch module assembly of claim 10 wherein the connector plate has an outer periphery including a plurality of tab portions each having a radially extending portion adjacent to an axially extending portion adjacent to a fastening portion.

15. The dual mass flywheel and dual clutch module assembly of claim 14 wherein the fastening portion of the connector plate includes at least one fastener bore and at least one structural stiffener.

16. The dual mass flywheel and dual clutch module assembly of claim 15 wherein the outer periphery of the center plate includes a plurality of radially extending tabs having at least one fastener bore, each of the plurality of tabs abuts the fastening portion of one of the plurality of tabs of the connector plate, and a rivet is disposed in each of the fastener bores of the connector plate and the drive plate.

17. A dual mass flywheel and dual clutch module assembly comprises:

a connector plate connector plate having a plurality of tabs on an outer periphery, the plurality of tabs having at least one fastener bore aligned with a fastener bore of a center plate of the dual clutch module, and wherein a rivet is disposed in each of the fastener bores of the connector plate and the center plate, the connector plate further having a plurality of castellation tabs extending in a first axial direction and disposed on an inner periphery of the connector plate; and a drive plate having an outer periphery including a plurality of tab portions that are keyed to rotationally connect with a flywheel member of the dual mass flywheel, the drive plate further having a plurality of castellation tabs extending in a second axial direction toward the connector plate, the second axial direction is opposite the first axial direction, and the plurality of castellation tabs are disposed on an inner periphery of the drive plate, and wherein the plurality of castellation tabs of the connector plate are interleaved with the plurality of castellation tabs of the drive plate and each one of the plurality of castellation tabs on the connector plate and the drive plate have a pilot feature.

18. The dual mass flywheel and dual clutch module assembly of claim 17 wherein the connector plate has an outer periphery including a plurality of tab portions each having a radially extending portion adjacent to an axially extending portion adjacent to a fastening portion.

19. The dual mass flywheel and dual clutch module assembly of claim 18 wherein the fastening portion of the connector plate includes at least one fastener bore and at least one structural stiffener.

20. The dual mass flywheel and dual clutch module assembly of claim 19 wherein the outer periphery of the center plate includes a plurality of radially extending tabs having at least one fastener bore, each of the plurality of tabs abuts the fastening portion of one of the plurality of tabs of the connector plate, and a rivet is disposed in each of the fastener bores of the connector plate and the drive plate.

* * * * *